United States Patent [19]

Matsuoka et al.

[11] 4,349,215
[45] Sep. 14, 1982

[54] COVERING STRUCTURE OF A GUIDE RAIL FOR A SEAT BELT

[75] Inventors: Hideoki Matsuoka, Yokohama; Yoshinobu Kondo, Kosai, both of Japan

[73] Assignees: Nissan Motor Co., Ltd., Yokohama; Fuji Kiko Co., Ltd., Tokyo, both of Japan

[21] Appl. No.: 117,442

[22] Filed: Feb. 1, 1980

[30] Foreign Application Priority Data

Feb. 5, 1979 [JP] Japan .............................. 54-13972[U]

[51] Int. Cl.³ ............................................. B60R 21/10
[52] U.S. Cl. .................................................... 280/804
[58] Field of Search .................. 280/804, 802; 160/19, 160/38

[56] References Cited

U.S. PATENT DOCUMENTS

| | | | |
|---|---|---|---|
| 4,061,365 | 12/1977 | Nagao et al. | 280/804 |
| 4,223,915 | 9/1980 | Tanaka | 280/804 |
| 4,232,885 | 11/1980 | Suzuki | 280/804 |
| 4,236,730 | 12/1980 | Suzuki | 280/804 |

Primary Examiner—Robert R. Song

[57] ABSTRACT

A covering structure of a guide rail fixed to an inner wall of a vehicle body, within which is slidably guided a slide member connected to a seat belt which comprises: a decorative cover covering the guide rail and slide member and flexible yarn-like bodies in the form of a brush at lower edges of the decorative cover, thereby preventing dust from entering an opening of the guide rail and a hand or a finger of a child from being jammed by the slide member and guide rail and obtaining a more aesthetical appearance of the guide rail.

1 Claim, 2 Drawing Figures

COVERING STRUCTURE OF A GUIDE RAIL FOR A SEAT BELT

BACKGROUND OF THE INVENTION

1. Field of the Invention

The present invention relates to a covering structure for a guide rail of a seat belt for use in a vehicle such as an automobile, and more particularly to a covering structure for a guide rail of a passive belt-type seat belt.

With a passive belt-type seat belt hitherto used, upon opening a door of an automobile for getting therein, a slide member in a guide rail provided inside a vehicle body is forwardly slidably pushed to a forward end of the guide rail by means of, for example, a push-pull wire connected to the driving power source in response to the opening of the door. In other words, the belt is moved away from a seat for a person with the aid of the opening of the door to enable him to sit on the seat. Upon closing the door after the person sits down, the slide member is returned to the rear end of the guide rail by means of a push-pull wire to bring the belt into position where it performs its function for protecting the person.

With this type of seat belt, however, as an opening of the guide rail (groove) and the slide member slidably fitted therein are exposed to the interior of the vehicle body, dust or other foreign particles tend to enter the opening of the guide rail coated with a lubricant and there is a risk of unexpected injury for children when they unintentionally insert their hands or fingers into the opening of the guide rail. In addition, such an exposed guide rail has a very unaesthetical appearance which is inferior in a sense of beauty of design.

SUMMARY OF THE INVENTION

It is an object of the invention to provide an improved covering structure for a guide rail of a seat belt, which eliminates all the disadvantages of the prior art above described.

It is another object of the invention to provide a covering structure for a guide rail of a seat belt designed so as to prevent dust from entering an opening of the guide rail and a hand or a finger of a child from being jammed by a slide member and the like and to obtain a more aesthetical appearance of the guide rail.

For these objects to be accomplished, the covering structure for a guide rail provided on an inner wall of a vehicle body for slidably receiving therein a slide member connected to a seat belt, according to the invention comprises covering means normally closing an opening of the guide rail and opening it when the slide member is moving.

In order that the invention may be more clearly understood, preferred embodiments will be described, by way of example, with reference to the accompanying drawings.

DETAILED DESCRIPTION OF THE PREFERRED EMBODIMENT

Figure 1:
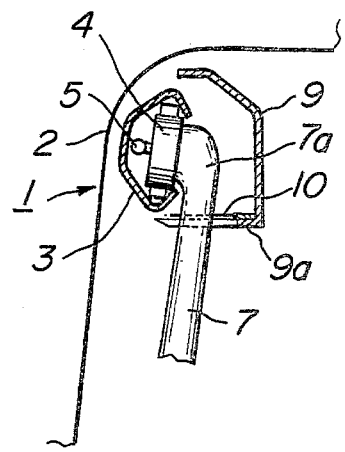
FIG. 1 is a sectional view of an embodiment of the invention.
Figure 2:
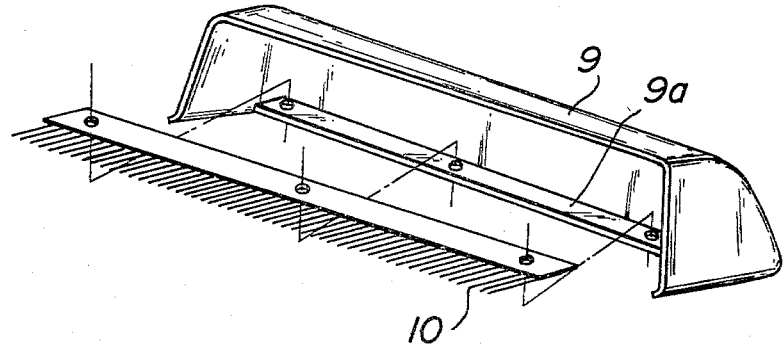
FIG. 2 is a perspective view of the embodiment shown in FIG. 3.

Referring to FIGS. 1 and 2 illustrating the invention, inside a roof side 2 of a vehicle body 1 is substantially horizontally arranged a guide rail 3 substantially channel-shaped in cross-section in which is slidably fitted a slide member 4. The slide member 4 has one end connected to a push-pull wire 5 as a drive cable and the other end substantially integrally formed with a slide anchor 7 for a buckle of a shoulder belt.

On the other hand, inside the roof side 2 where the guide rail 3 is positioned, a decorative cover 9 made of, for example, a synthetic resin is arranged so as to externally cover or enclose the opening 3a of the guide rail 3 and a base 7a of the slide anchor 7 integral with the slide member 4. The decorative cover 9 is provided at its lower edges 9a with horizontally extending yarn-like bodies 10 in the form of a brush, each made of bundles of a number of twisted yarns.

With this arrangement, therefore, the yarn-like bodies move easily without obstructing any movement of the slide member 4, when it is forwardly slid within the guide rail 3 by means of the push-pull wire 5 as driving means at the moment a door of the vehicle is opened. Moreover, the guide rail 3 and slide member 4 are covered with the decorative cover 9 and yarn-like bodies 10 to prevent dust from entering thereinto and to prevent a child or the like from inserting his or her finger or hand thereinto.

As can be seen from the above description, according to the invention, inside the roof side 2 of the vehicle body 1 is provided the guide rail 3 in which is slidably fitted the slide member 4 connected to the slide anchor 7. Inside the roof side 2 is provided the decorative cover 9 in a manner covering the slide member 4 and opening of the guide rail 3, and the flexible yarn-like bodies 10 are provided at the lower edges 9a of the decorative cover 9, thereby preventing the entrance of dust, avoiding the risk of unintentional insertion of a finger or hand of a child into the guide rail or the like and obtaining a more aesthetical appearance of the guide rail.

while the invention has been as applied to the guide rail arranged along the roof side, it may also be applied to the door or another part. Moreover, while the invention has been illustrated with the slide anchor integrally fixed to the slide member, it may be applied to a passive belt in which a belt is adapted to move through a through-ring integrally fixed to the slide member.

It is further understood by those skilled in the art that the foregoing description is that of preferred embodiment of the disclosed structure and that various changes and modifications may be made in the invention without departing from the spirit and scope thereof. What is claimed is:

1. A covering structure for a guide rail provided on an inner wall of a vehicle body and having an opening for slideably receiving therein a slide member connected to a seat belt, comprising: a cover and covering means normally closing said opening of said guide rail but opening the same when said slide member moves therein, said covering means being formed by yarn-like bodies extending horizontally from a lower edge of said cover.

* * * * *